United States Patent [19]

van der Lely

[11] 4,164,258

[45] * Aug. 14, 1979

[54] SOIL CULTIVATING IMPLEMENTS

[76] Inventor: Cornelis van der Lely, 7, Brüschenrain, Zug, Switzerland

[*] Notice: The portion of the term of this patent subsequent to Jan. 14, 1995, has been disclaimed.

[21] Appl. No.: 596,828

[22] Filed: Jul. 17, 1975

[30] Foreign Application Priority Data

Jul. 18, 1974 [NL] Netherlands .......................... 7409705

[51] Int. Cl.² ............................................. A01B 33/14
[52] U.S. Cl. ........................................ 172/59; 172/91; 172/96
[58] Field of Search ...................................... 172/49–52, 172/56–60, 91, 96, 108, 111, 123, 125, 522–526, 543, 545, 685, 700, 705–708, 711, 713, 714, 748, 762, 765, 766

[56] References Cited

U.S. PATENT DOCUMENTS

| 78,400 | 5/1868 | Standish | 172/523 |
|---|---|---|---|
| 937,607 | 10/1909 | Hoover | 172/526 |
| 1,644,449 | 10/1927 | Rodriguez | 172/552 X |
| 2,034,779 | 3/1936 | Storey | 172/59 |
| 2,873,808 | 2/1959 | Rome | 172/524 |
| 3,616,862 | 11/1971 | van der Lely | 172/59 X |
| 3,667,551 | 6/1972 | van der Lely et al. | 172/59 |

FOREIGN PATENT DOCUMENTS

| 1207687 | 12/1965 | Fed. Rep. of Germany | 172/706 |
|---|---|---|---|
| 66875 | 5/1957 | France | 172/59 |
| 1486568 | 5/1967 | France | 172/111 |
| 545002 | 6/1956 | Italy | 172/111 |
| 1333 | of 1868 | United Kingdom | 172/59 |

Primary Examiner—Paul E. Shapiro
Attorney, Agent, or Firm—William B. Mason; Penrose Lucas Albright

[57] ABSTRACT

A soil cultivating implement has soil working members mounted for rotation about corresponding upwardly extending axes. A soil working tool, preferably one or more tines, is connected to a support of the soil working member by at least one quick release fastener. The tool or tine can be a torsioned spring steel strip or a rod that has a spring coil. Each tine can have one or more operative soil contacting ends that are spaced apart from one another. When the operative ends are located one above the other, the soil working member can work deep in the soil. The fastener can be a pin that extends horizontal and at right angles to the axis of rotation of the soil working member so that the operative ends can pivot to some extent about the fastener. The ends of each tool or tine can extend in different directions from one another and tines in pairs can be mounted on the same support. The support can include arms pivoted to the fastening portions of the tines by spaced apart pins. Also, the support can be a sleeve hub that is received in a hollow frame portion.

12 Claims, 26 Drawing Figures

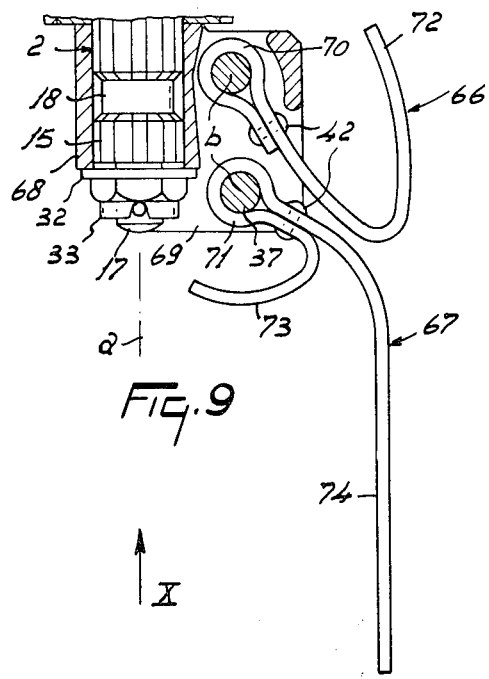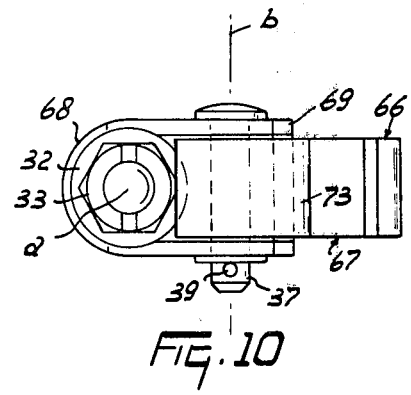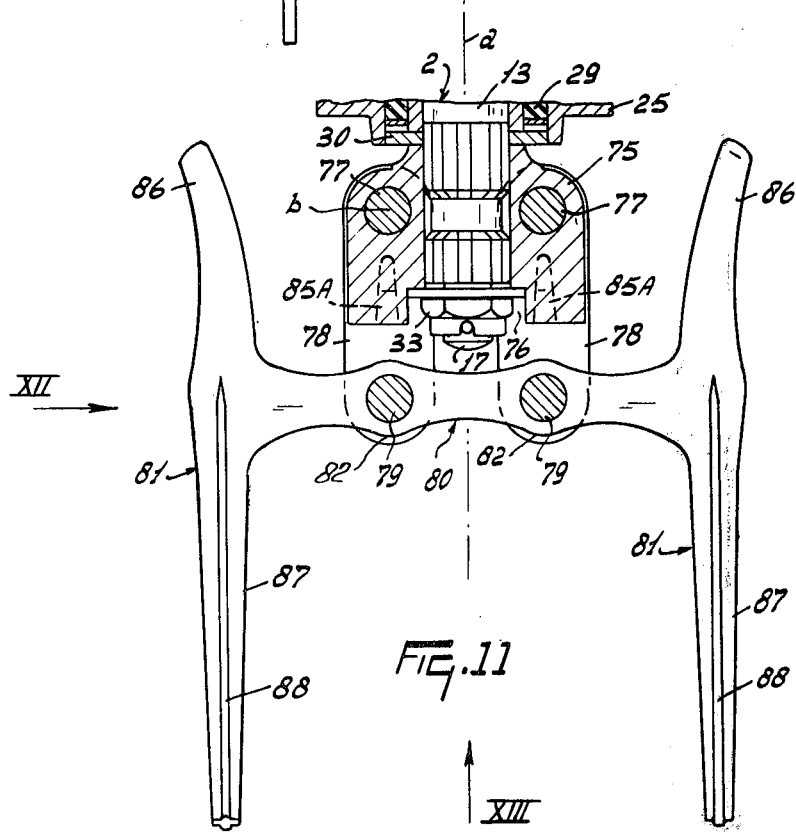

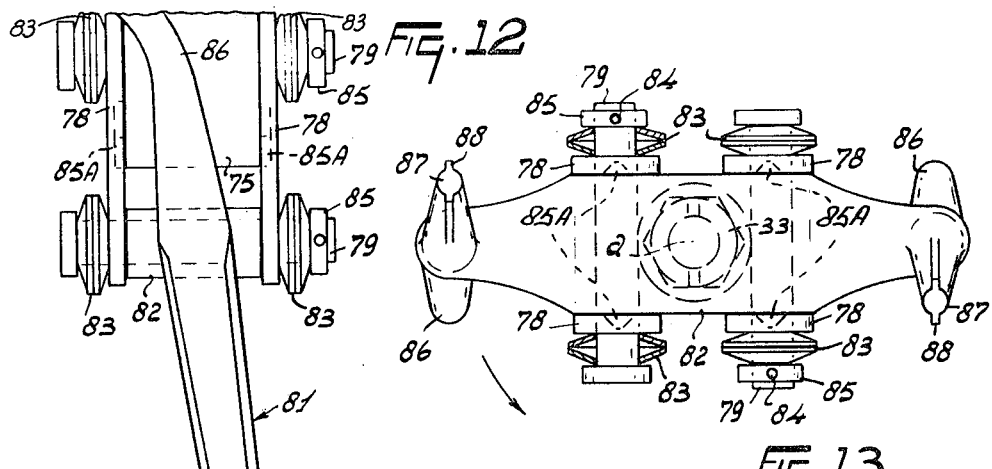
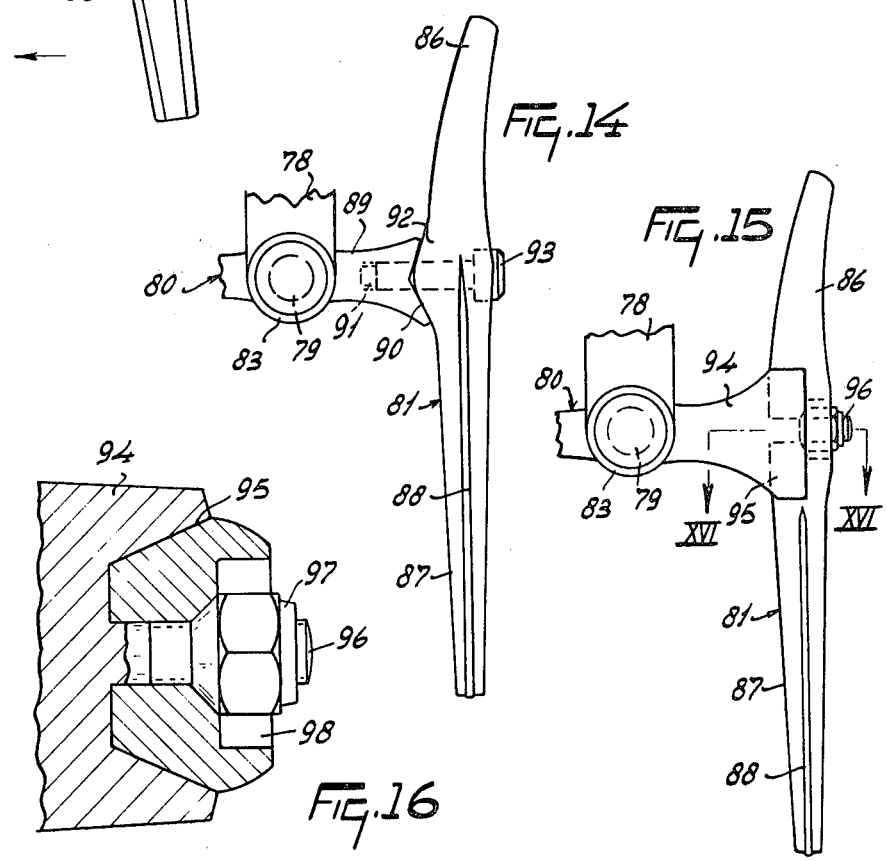

SOIL CULTIVATING IMPLEMENTS

Figure 1:
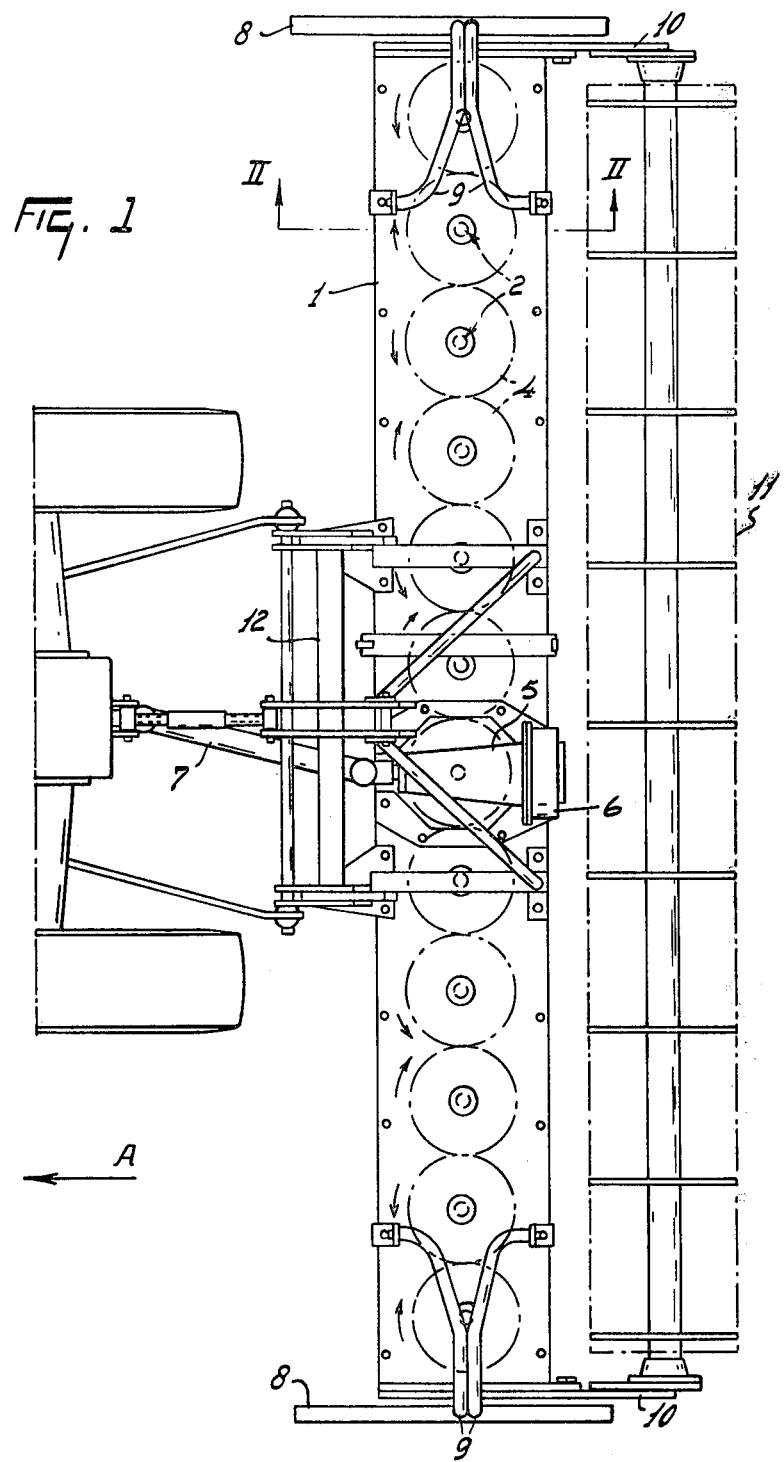
Figure 2:
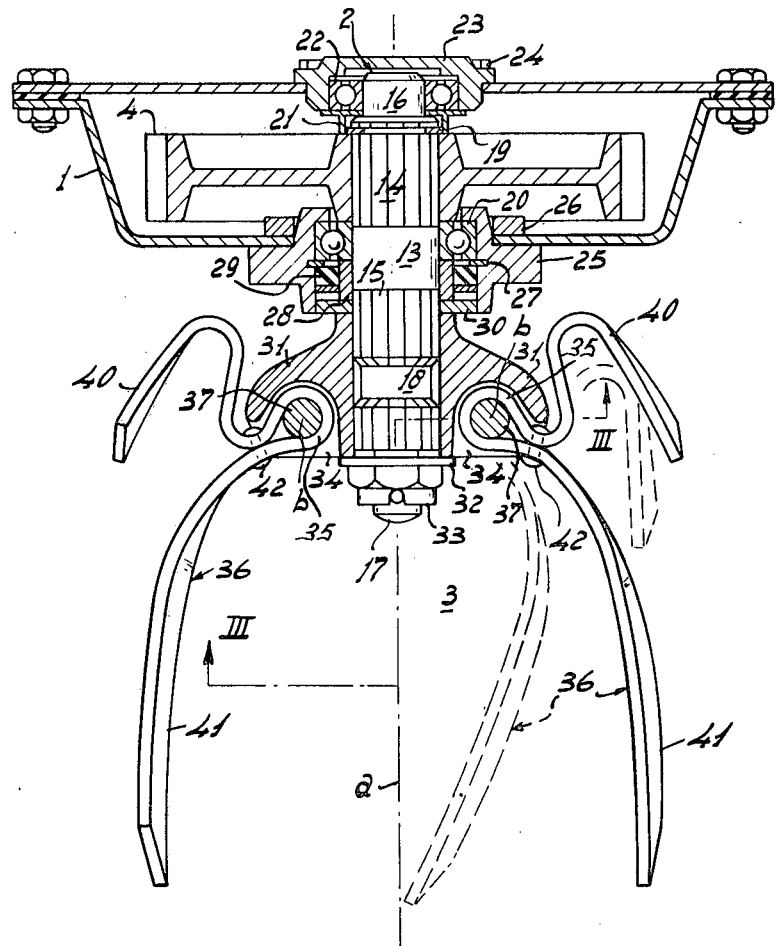
Figure 3:
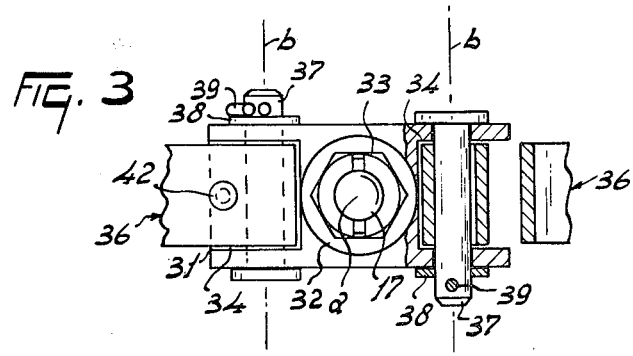
Figure 4:
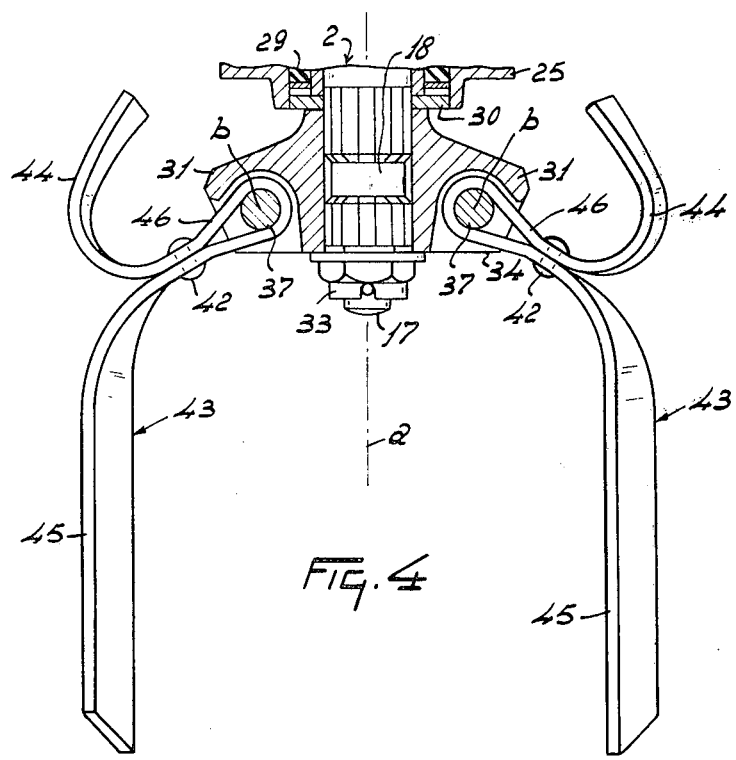
Figure 5:
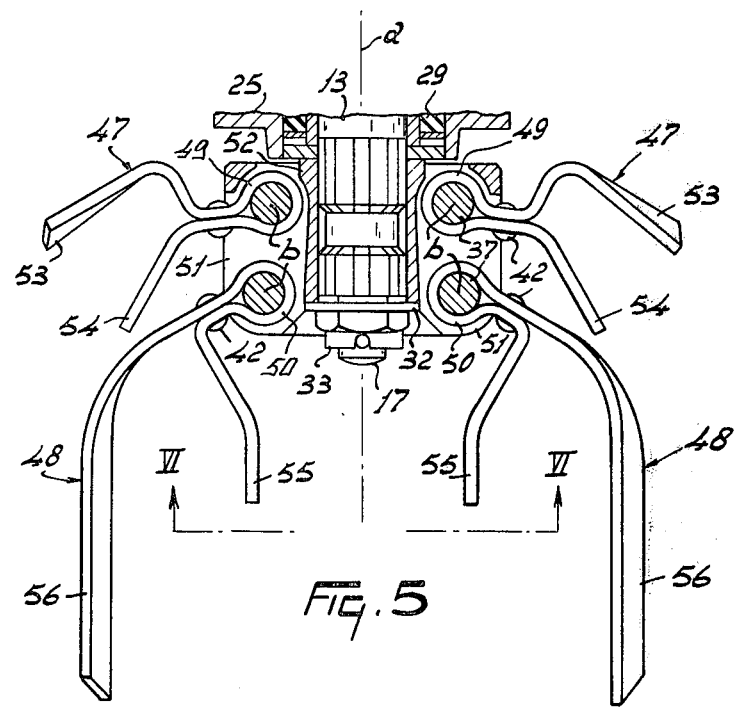
Figure 6:
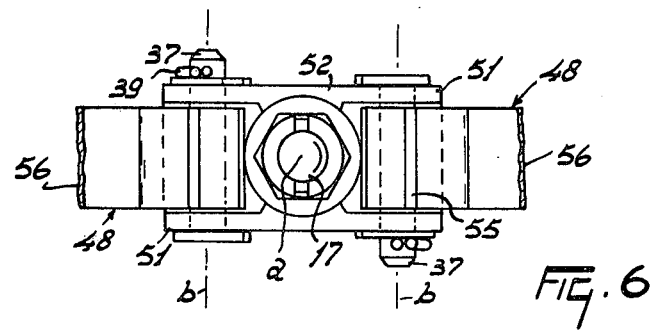
Figure 7:
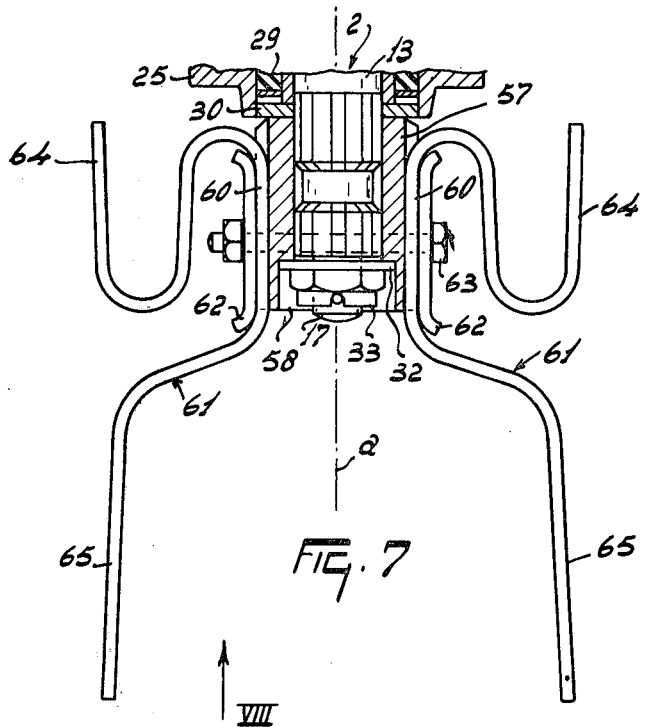
Figure 8:
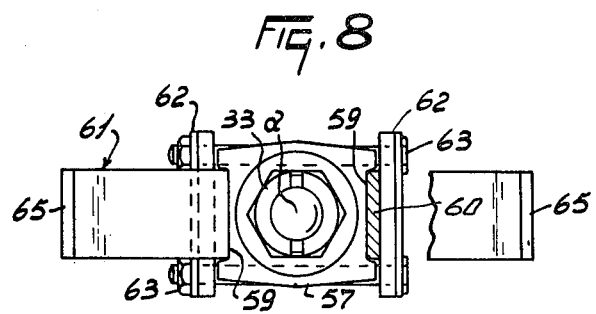
Figure 17:
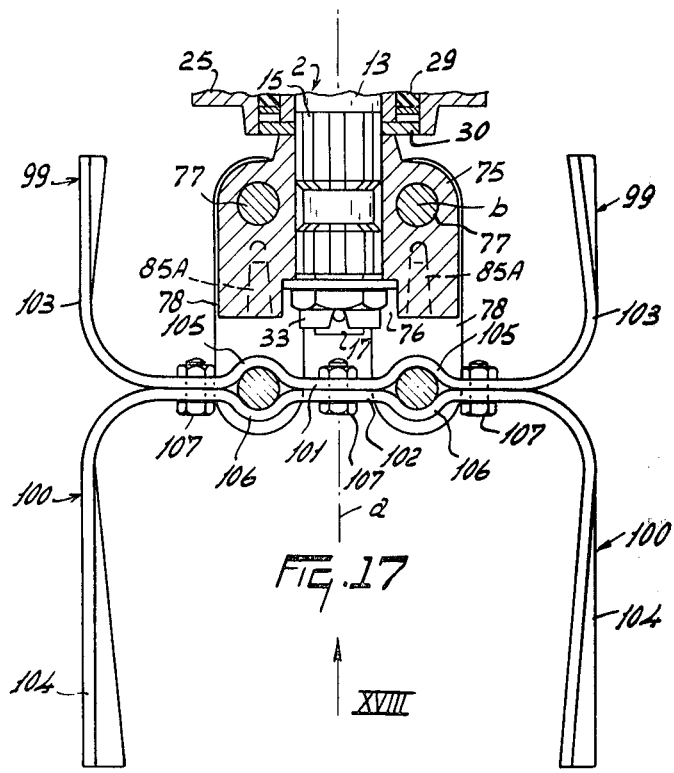
Figure 18:
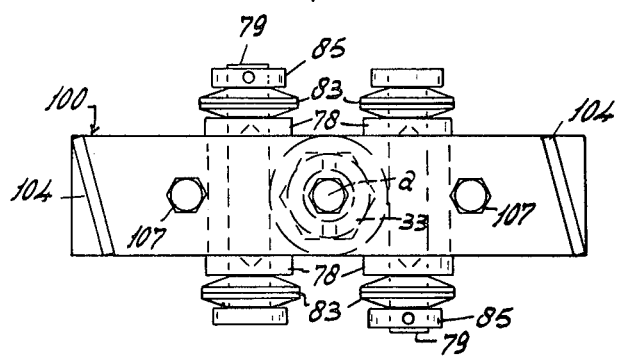
Figure 19:
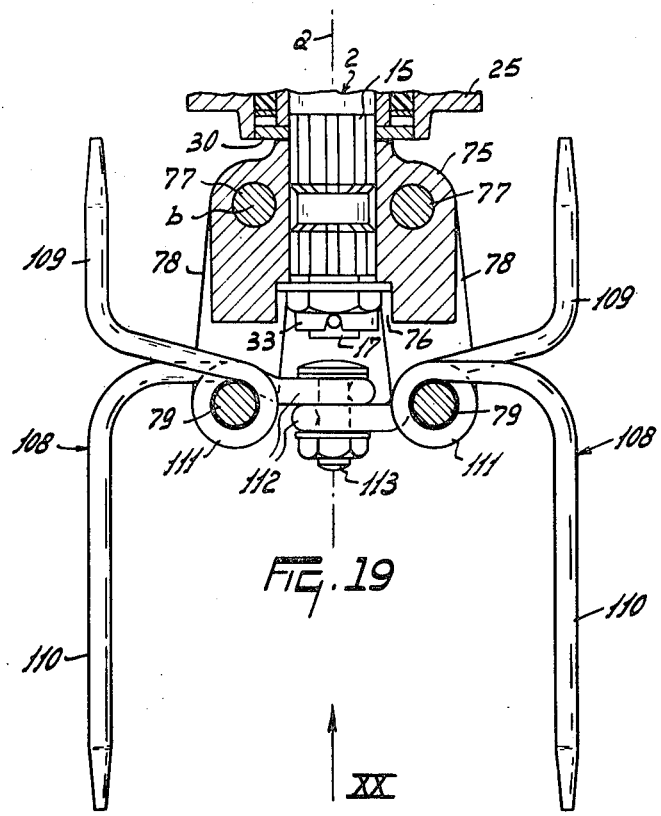
Figure 20:
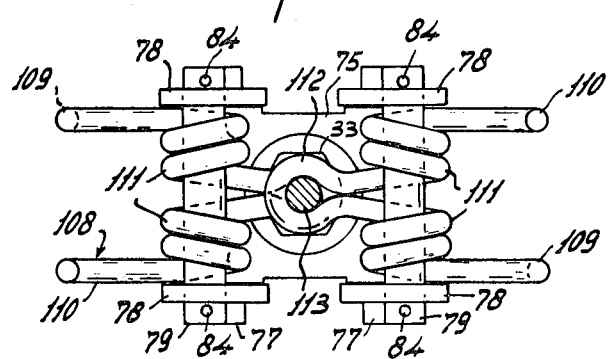
Figure 21:
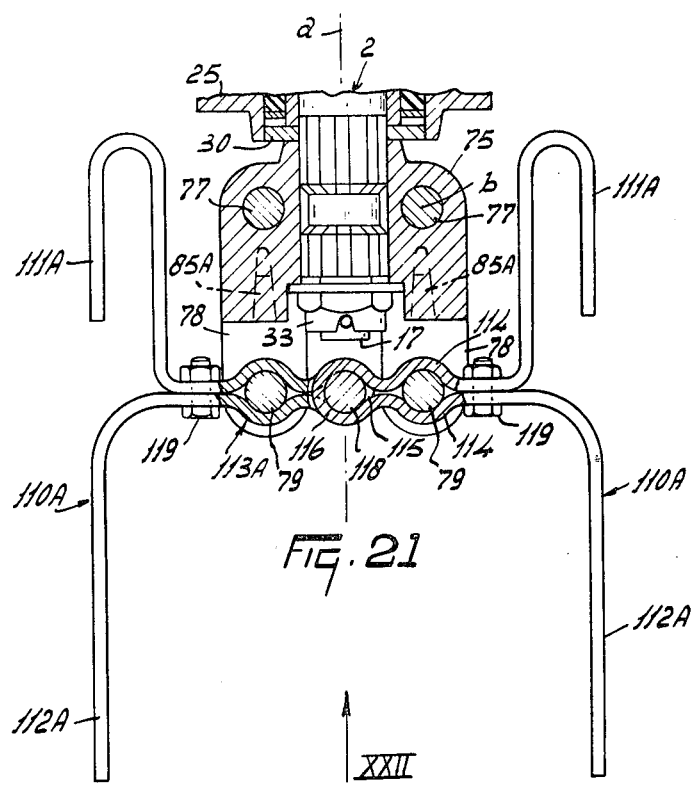
Figure 22:
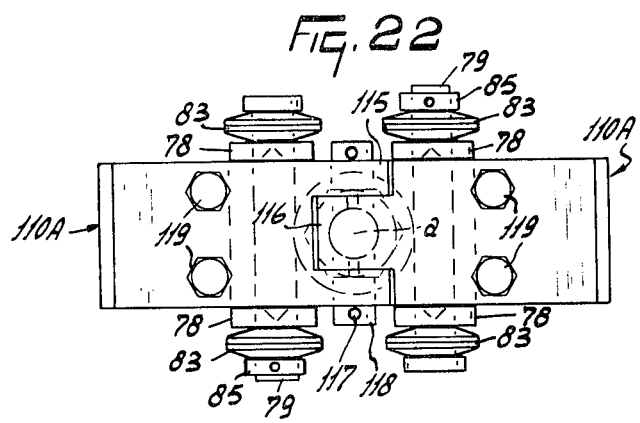
Figure 23:
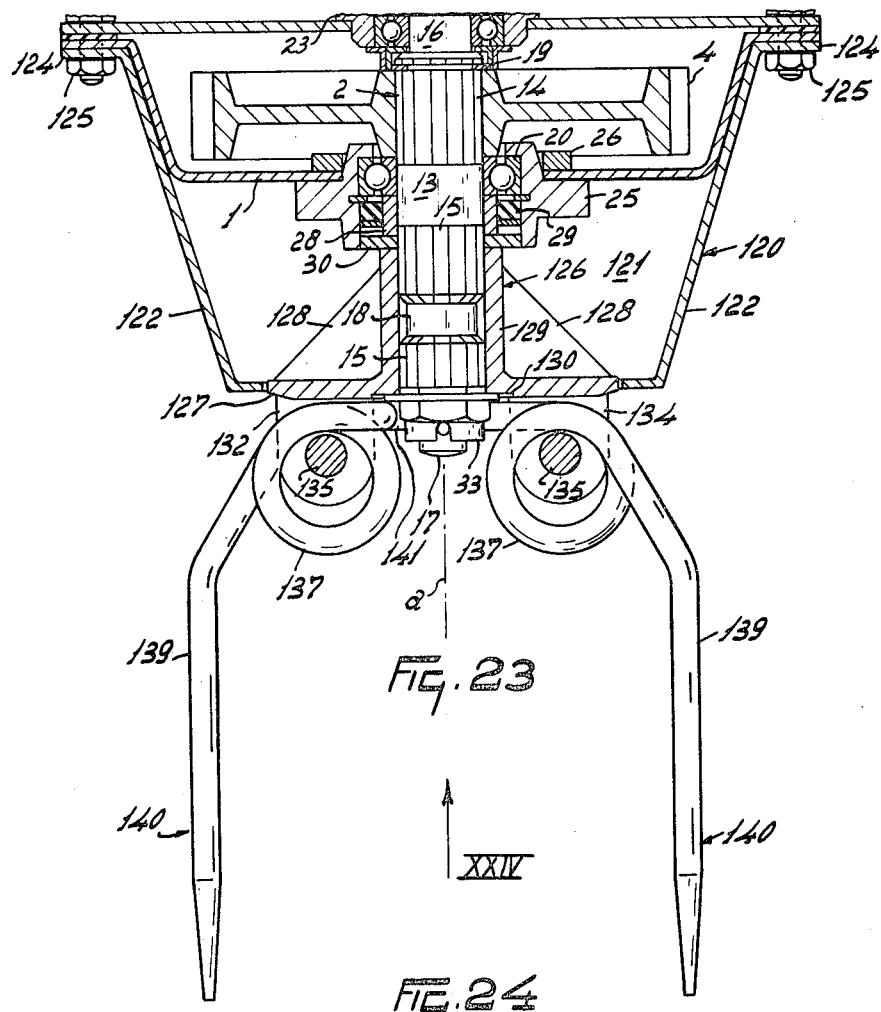
Figure 24:
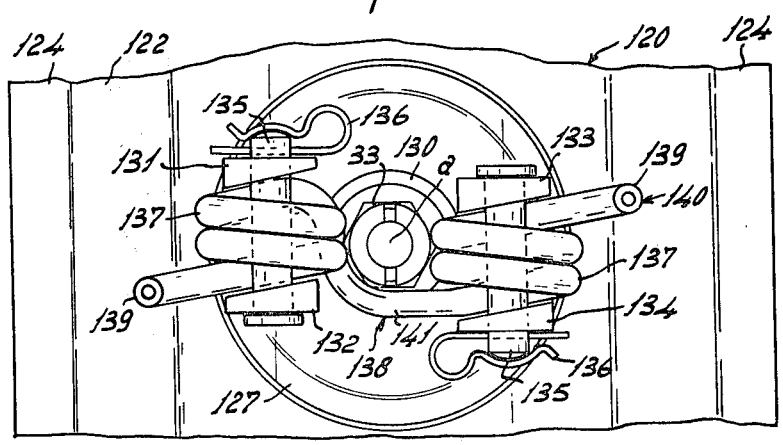
Figure 25:
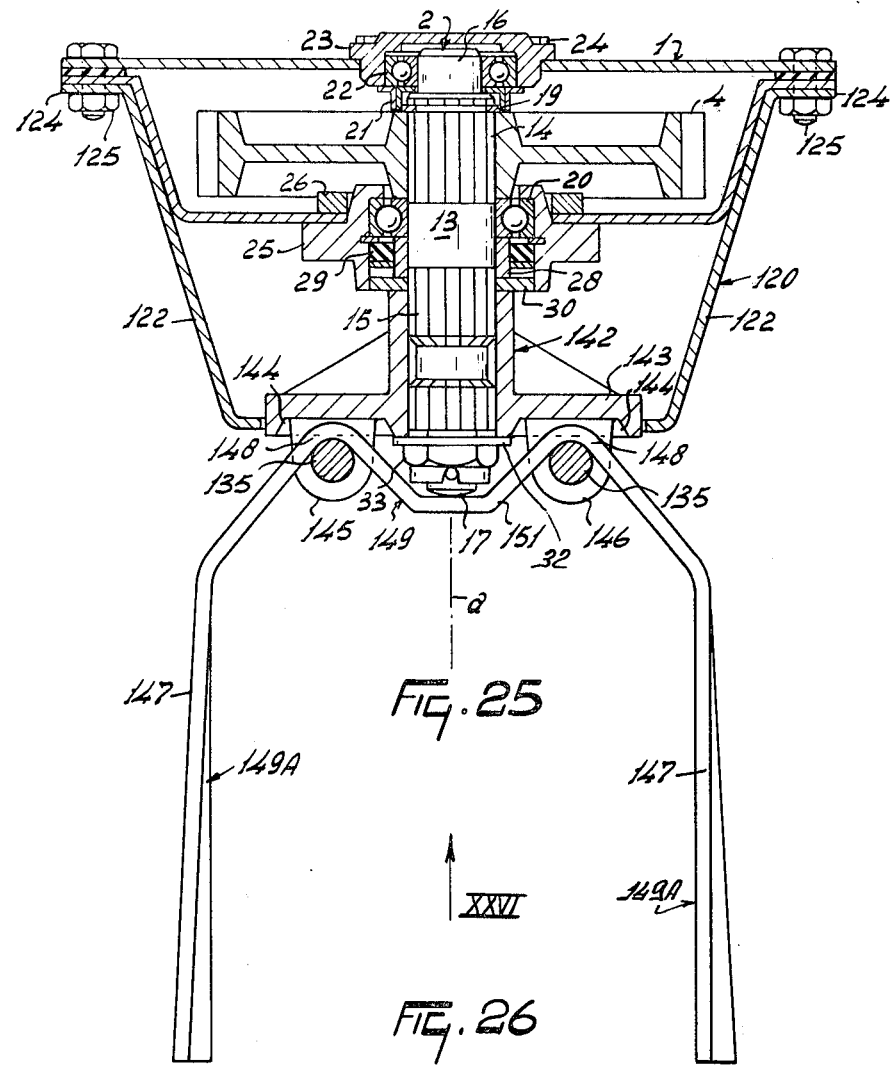
Figure 26:
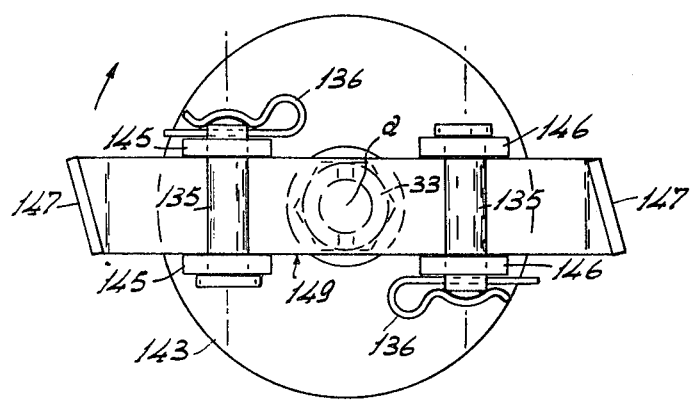

For a better understanding of the invention, and to show how the same may be carried into effect, reference will now be made, by way of example, to the accompanying drawings, in which:

FIG. 1 is a schematic plan view of an implement comprising a construction in accordance with the invention, FIG. 2 is an enlarged sectional elevation taken on the line II—II in FIG. 1, FIG. 3 is a section taken on the line III—III in FIG. 2, FIG. 4 is a sectional elevation, similar to FIG. 2, of a second embodiment of a tine and its mode of mounting in accordance with the invention, FIG. 5 is a sectional elevation, similar to FIG. 2, of a third embodiment of a tine and its fastening mode in accordance with the invention, FIG. 6 is an bottom plan view as seen on the line VI—VI in FIG. 5, FIG. 7 is a sectional elevation, similar to FIG. 2, of a fourth embodiment of a tine and its fastening mode in accordance with the invention, FIG. 8 is an bottom plan view as seen in the direction of the arrow VIII in FIG. 7, FIG. 9 is a sectional elevation, similar to FIG. 2, of a fifth embodiment of tines and their fastening mode in accordance with the invention, FIG. 10 is an bottom plan view as seen in the direction of the arrow X in FIG. 9, FIG. 11 is a sectional elevation, similar to FIG. 2, of a sixth embodiment of a tine and its fastening mode in accordance with the invention, FIG. 12 is a side elevation as seen in the direction of the arrow XII in FIG. 11, FIG. 13 is an bottom plan view as seen in the direction of the arrow XIII in FIG. 11, FIG. 14 illustrates one embodiment of the connection between a tine and its fastening, FIG. 15 shows a second embodiment of the junction between a tine and its fastening, FIG. 16 is a section, to an enlarged scale, taken on the line XVI—XVI in FIG. 15, FIG. 17 is a sectional elevation, similar to FIG. 2, of a seventh embodiment of tines and their fastening mode in accordance with the invention, FIG. 18 is an bottom plan view as seen in the direction of the arrow XVIII in FIG. 17, FIG. 19 is a sectional elevation, similar to FIG. 2, of an eight embodiment of a tine and its fastening mode in accordance with the invention, FIG. 20 is an bottom plan view as seen in the direction of the arrow XX in FIG. 19, FIG. 21 is a sectional elevation, similar to FIG. 2, of a ninth embodiment of a tine and its fastening mode in accordance with the invention, FIG. 22 is an bottom plan view as seen in the direction of the arrow XXII in FIG. 21, FIG. 23 is a vertical cross-sectional view of a frame portion supporting soil working members with a tenth embodiment of a tine and its fastening mode in accordance with the invention, the tine support being located inside the frame portion, FIG. 24 is an bottom plan view as seen in the direction of the arrow XXIV in FIG. 23, FIG. 25 is a sectional view, similar to FIG. 23, of an eleventh embodiment of a tine and its fastening mode, the tine support again being located inside the frame portion which holds the soil working members, and FIG. 26 is an bottom plan view as seen in the direction of the arrow XXVI in FIG. 25.

Referring to FIGS. 1 to 3 of the accompanying drawings, the soil cultivating implement or rotary harrow that is shown in FIG. 1 comprises a hollow box-shaped frame portion 1 extending perpendicularly transverse to the intended direction of operative travel A. Beneath the horizontally disposed frame portion 1, a plurality of soil working members are arranged at equal intervals by means of corresponding upright shafts 2 whose longitudinal axes are normally vertical or substantially vertical. The distance between the axes of the shafts 2 of immediately neighbouring soil working members 3 is not greater than 30 cms. and preferably amounts to substantially 25 cms. Each of the shafts 2 is provided, inside the hollow frame portion 1, with a corresponding straight- or spur-toothed gear wheel 4 so that two gear wheels 4 on the shafts 2 of adjacent soil working members are drivably interconnected. Near the center of the hollow frame portion 1, a shaft 2 of one of the soil working members 3 is extended upwardly into a gear box 5. Inside the gear box 5 the shaft extension is connected through a horizontal shaft extending in the direction A and a change-speed gear 6 with a further shaft that also extends in the direction A and that is located above the former horizontal shaft, which upper shaft can have its leading splined end coupled through a known auxiliary shaft 7 with the power take-off shaft of a tractor or other operating vehicle (FIG. 1). The hollow frame portion 1 is provided at its ends with screens 8 which are movable upwardly and downwardly during operation and which are connected by arms 9 with the top of the hollow frame portion 1 so as to be pivotable about axes extending parallel to the direction A. The hollow frame portion 1 is furthermore provided at its ends with rearwardly extending arms 10 which are pivotable upwardly and downwardly and fixable in a plurality of positions relative to the frame portion 1. Between their rearmost ends, the arms 10 hold a rotatable supporting member 11, in the form of an open ground roller, with the aid of which roller the working depth of tines of the soil working members 3 can be controlled. The front of the hollow frame portion 1 is provided with a coupling member or trestle 12 by which the implement can be attached to the three-point lifting device or hitch of the tractor or other vehicle.

As stated above, each soil working member 3 is rotatable with a corresponding upright shaft 2 relative to the hollow frame portion 1. Each shaft 2 has, near its center, a smooth or plain portion 13 which is flanked above and beneath by splined portions 14 and 15, each of which portions 14 and 15 terminates in a plain stub shaft 16 and a screw-threaded stub shaft 17, respectively (FIG. 2). The splined portion 15 is interrupted centrally by a narrowed plain part 18 which facilitates manufacture. Near the junction of the portion 14 with the stub shaft 16, a groove holds a ring 19 consisting of two identical parts. The ring 19 serves as a locking ring for the gear wheel 4, the bottom of whose hub abuts against a ball bearing 20 arranged around the smooth or plain portion 13 of the shaft 2. The hub of the gear wheel 4 supports, at its top, a sleeve-like ring 21 provided at its upper end with a rim or flange that is directed both inwardly and outwardly, the lower end of said ring 21 retainingly enclosing the two parts of the ring 19. The rim or flange at the top of the sleeve-like ring 21 holds a ball bearing 22 which is arranged around the plain stub shaft 16 and is accommodated in a housing 23 that is supported in a hole in the top of the hollow frame portion and which is fixed in place by bolts 24. The ball bearing 20 is enclosed in a housing 25 which is held in a hole in the bottom of the hollow frame portion 1 and which is fastened in place by bolts that co-operate with a fastening ring 26. Beneath the bearing 20, which is supported by a circlip 27 with respect to the housing 25, a spacing sleeve 28 is arranged inside the housing 25. The spacing sleeve 28 is surrounded by an oil seal 29, which is enclosed between the circlip 27 and a locking ring 30 located just inside the lower rim of the housing 25. Against the locking ring 30 bears the top of a support 31 that is preferably formed from a cast metallic material, such as steel, said support 31 being slipped onto the splined portion 15. The bottom of the support 31 is engaged by a locking washer 32 which is urged against the bottom of the support by a nut 33 screwed onto the screwthreaded stub shaft 17. The support 31 has recesses 34 located diametrically opposite one another on either side of the axis of rotation of the corresponding soil working member 3, said axis being afforded by the longitudinal center line a of the shaft 2 concerned. The recesses 34 are open on the bottom. Each of the recesses 34 holds a loop-like fastening portion 35 of a corresponding tine 36 which is fixed by a pin 37 passed through the loop in the recess 34 and located between the ends of the tine. The pin 37 is passed through two registering bores in the support 31 and is held in place at one end by a ring 38 and a spring pin 39 (FIG. 3). The pin 37 with the ring 38 and the spring pin 39 together constitute a quick-release for fastening the tine 36. The loop-like fastening portion 35 is freely pivotable to a limited extent about the pin 37. The walls of the recesses 34 serve as stops and the longitudinal axis b of the pin 37 constitutes a pivotal axis which is inclined to the axis of rotation a of the soil working member 3 at least substantially at right angles and extends tangentially to that axis.

Each tine 36 of each soil working member 3 is made from leaf spring steel of a thickness of at least 5 mms. and a width of at least 50 mms.; it is secured so that its broader surfaces extend at least substantially tangentially to the axis of rotation a of the corresponding soil working member 3. The tine 36 comprises two operative portions 40 and 41 which are located one above the other and which extend, at least by a predetermined part, in the same direction. Away from the point where the ends of the loop-like fastening portion 35 are clamped together by a rivet 42, the upper operative portion 40 initially extends by a straight portion in an upward direction and slightly towards the axis of rotation a and then, after a curve of about 180°, it terminates in a straight portion extending downwards and outwards. The portion 40 is slightly torsioned twisted about its longitudinal axis throughout its length so that, with respect to the intended direction of operative rotation, its front edge is at a larger distance from the axis a than is its rear edge. Considered in the same direction, each portion 40 occupies a trailing disposition. The free end of the upper operative portion 40 is bent over at right angles (see FIG. 2). The lower operative portion 41 of the tine 36 extends away from the fastening portion 35 through a slide outwardly directed curve and then at least substantially parallel to the axis a. The free end of the lower operative portion 41 is nearer to the axis a than is the free end of the upper operative portion 40. Away from the curved, the downwardly extending portion of the operative portion 41 is torsioned about its longitudinal axis so that, considered in the intended direction of operative rotation of the soil working member 3, the front edge is further spaced from the axis a than is the rear edge. Moreover, considered in the intended direction of operative rotation of the soil working member 3, the operative portion 41 is also in a trailing disposition. Each pair of tines 36 is capable of turning so that the free ends of the lower operative portions 41 thereof can come into contact with one another in the neighbourhood of an imaginary extension of the axis a (FIG. 3). As is shown in FIG. 2, each rivet 42 is located wholly or principally inside the corresponding recess 34, viewed in the direction of the axis a.

In the embodiment shown in FIG. 4 the components corresponding with those of the preceding embodiment are designated by the same reference numerals. In this embodiment each soil working member comprises two tines 43 of leaf spring steel.

As in the preceding embodiment, each tine 43 has two operative portions 44 and 45, which are located directly, or substantially directly, one above the other. In this embodiment, the ends of a loop-like fastening portion 46, through which the pin 37 is passed, are clamped together at a larger distance from the pin so that, unlike the preceding embodiment, the rivet 42 is not located inside the circumference of the support 31, viewed in the direction of the axis a. The upper operative portion 44 of the tine 43 extends in a direction substantially opposite to that of the operative portion 45 and, away from a fastening portion 46, it extends up to its free end by a curve of about 180° in an upward direction and, towards its free end, the operative portion 44 is at least substantially straight and extends towards the axis a.

As in the preceding embodiment, the operative portion 44 of this embodiment is in a trailing position with respect to the intended direction of operative rotation and, over a major part of its length, it is torsioned about its longitudinal axis so that, considered in the intended direction of operative rotation of the corresponding soil working member, the front edge is at a larger distance from the axis a than is the rear edge. The lower operative portion 45 is initially straight away from the fastening portion 46 and terminates through a curve in a portion that extends at least substantially parallel to the axis a and perpendicularly downwards. Also, this operative portion 45 is torsioned about its longitudinal axis over substantially the whole of its length and, considered in the intended direction of operative rotation, the front edge is at a larger distance from the axis a than is the rear edge. The lower operative portion 45 also occupies a trailing position with respect to the intended direction of operative rotation. The mode of supporting each tine 43 between its ends so that it is capable of turning about an axis b, which is at an angle of at least substantially 90° to the axis a and which axis b extends at least substantially in a tangential direction, completely corresponds with the pivotable support of the tine 36 of the first embodiment.

In the embodiment shown in FIGS. 5 and 6, two tines 47 and 48 are arranged one above the other and diametrically opposite to one another on either side of the axis a. The two tines 47 and 48 have a loop-like fastening portion 49 and 50 respectively, arranged in corresponding recesses 51 of a support 52, said portions 49 and 50 being pivotally supported in the manner described above and being held in place by a quick-release fastening.

As in the preceding embodiments, the ends of the loops forming the fastening portions 49 and 50 respectively, are clamped together with the aid of rivets 42 which rivets are located near the circumference of the support 52. Each tine 47 and 48 has two operative portions 53 and 54, 55 and 56 respectively, which portions extend, considered from their free ends, to a major extent at least substantially parallel to one another. The upper operative portion 53 of each upper tine 47 has, away from the fastening portion 49, an at least substantially straight part inclined upwardly and outwardly and terminating through a curve of about 120° in a downwardly and outwardly inclined straight part. The latter part is torsioned in a similar manner to the preceding embodiments. The lower operative portion 54 of each tine 47 terminates, away from the fastening portion 49, through a slight curve in a straight part extending downwardly and outwardly, which straight part is not torsioned.

As stated above, each lower tine 48 has two operative portions 55 and 56 which extend at least substantially in the same direction, substantially downwards and parallel to the axis a. Each operative portion 56 has a length which is twice that of the other operative portion 55. Each operative portion 56 has a straight part inclined away from the fastening portion 50 downwards and outwards and terminating through a curve in a downwardly extending straight part. The latter part is torsioned in the manner described above. The short operative portion 55 of each tine 48 has a straight part inclined away from the fastening portion 50 in a downward direction towards the axis a and terminating through a slight curve in a straight part extending downwards. The operative portions 55 are not torsioned. The operative portions of the upper and lower tines, like the operative portions of the tines of the preceding embodiments, are in trailing positions with respect to the intended directions of rotation of the corresponding soil working members.

In the embodiment shown in FIGS. 7 and 8, the parts corresponding with those of the preceding embodiments are designated by the same reference numerals. In this embodiment, a support 57 is formed by a sleeve arranged around the splined portion 15 of the shaft 2 and is held in place by the locking washer 32 and the nut 33 located inside a recess 58 of the sleeve-like support 57. The support 57 has recesses 59 on opposite sides that extend in the longitudinal direction of the support and each recess holds a fastening portion 60 of a corresponding leaf spring steel tine 61. Each fastening portion 60 extends at least substantially parallel to the axis a and is fixed in place by clamping pieces 62 and bolts 63 on either side of the shaft 2. As in the preceding embodiments, each tine 61 comprises an upper and a lower operative or working portion 64 and 65, respectively. The upper operative portion 64 of each tine 61 has a straight part inclined away from the fastening portion 60 through a curve of about 180° in a downward and outward direction, said part terminating through a curve of about 180° in an upwardly extending, at least substantially straight, part which extends at least substantially parallel to the axis a. The lower operative portion 65 terminates through a curved part in an at least substantially straight part that is inclined, downwardly and outwardly to terminate through a curve in a downwardly extending, straight part the free end of which extends slightly outwardly. In this embodiment, the free ends of the operative portions 64 and 65 are located at least substantially vertically one above the other. The operative portions of the tines do not comprise torsioned parts and, with respect to the intended direction of operative rotation of the corresponding soil working member, they are not in trailing positions.

In the embodiment shown in FIGS. 9 and 10, the elements corresponding with those of the preceding embodiments are designated by the same reference numerals. In this embodiment, two tines 66 and 67 are arranged one above the other on a support 68 at only one side of the axis a. The support 68 has a recess 69 accommodating, as in the preceding embodiments, loop-like fastening portions 70 and 71 of the two tines by means of quick release fastenings. Also in this case, the walls of the recess 69 constitute stops for limiting pivotal movements of the tines about the axes b. The rivets 42 for clamping the ends of the loops are located, for the upper tine, completely inside the recess 69 of the support 68 and, for the lower tine, substantially completely inside said recess 69. The upper tine 66 has only one operative portion 72 which has a part extending away from the fastening portion 70 and slightly curved on the side of the axis a, said part being inclined downwardly and outwardly and terminating through a curve of about 180° in a part that is slightly curved inwardly and upwardly. The lower tine 67, like the tines of the preceding embodiments, has two operative portions 73 and 74 that extend mainly in opposite directions. The operative portions 73 and 74 have such a difference in length that the shorter operative portion 73 has a length which is about one third of the length of the longer operative portion 74. The longer operative portion 74 joins the fastening portion 71 by a short, straight part that is inclined downwards and outwards, said part terminating through a curve in a downwardly extending, straight part that is at least substantially parallel to the axis a. The shorter operative portion 73 of the tine 67 has a curve of about 180° joining the fastening portion 71 and extending downwardly and inwardly and terminating in an at least substantially straight part that extends inwardly and slightly upwardly. The lower tine 67 is capable of deflecting so that the free end of its operative portion 74 can move in an inward direction at least up to an imaginary extension of the axis a. During normal operation, each tine is in substantially the position shown in FIG. 9.

In the embodiment shown in FIGS. 11 to 13, a support 75 in the form of a casting is arranged around the splined portion 15 of the shaft 2, said support 75 having a recess 76 at the bottom which holds the locking washer 32 and the fastening nut 33 so that the latter practically does not project out of the bottom of the support 75. The support 75 has bores near its top whose longitudinal axes are at least substantially perpendicular to the axis a, said bores extending at least substantially tangentially to the axis a. Each of the bores receives a corresponding pin 77 about which, on each side of the support 75, an arm 78 is arranged, said arms being at least substantially straight as shown in FIG. 13 and extending as far as beneath the support 75. Each of the arms 78 is provided near its lower end with a pin 79, which pin is passed through openings in a fastening portion 80 between two tines 81 that are located one on each side of the axis a, the interconnecting portion 80 and the tines being made integrally by forging them from a single piece of steel or other metallic material. At the level of the pins 79, the fastening portion 80 has widened parts 82 (FIGS. 11 and 12). The ends of the pins 77 and 79 that project beyond that arms 78 are surrounded by pairs of cup springs 83 which co-operate at one end of each pin with its head and at the other end with a locking ring 85 fastened in position by a small transverse spring pin 84. FIGS. 12 and 13 show that the rings 85 and the spring pins 84 are located behind the support 75, considered in the intended direction of operative rotation, so that soiling of the detachable joint is avoided or considerably reduced. The locking rings 85 with the spring pins 84 and the pins 77 and 79 constitute a quick release fastening for the pivotal mounting of the fastening portion 80 located between the tines 81. The arms 78 are provided, at the sides facing the support 75, with recesses which co-operate with cams or projections 85A on the support under the action of the cup springs 83 so that turning of the arms is opposed (FIGS. 12 and 13). The center lines of the pins 77 and 79 constitute the axes of a parallelogram linkage, said axes being located one above the other in pairs on either side of the axis a.

The fastening portion 80 that is connected with the lower pins 79 is integral with the tines 81, each tine having an operative portion 86 extending above the fastening portion 80 and an operative portion 87 extending beneath the fastening portion 80 so that, viewed in side elevation, the tines 81 and the fastening portion 80 together assume the shape of a letter H (FIG. 11). The assembly 80/81 is formed by forging and the upwardly extending operative portion 86 of each tine 81 is, viewed lengthwise of the portion 80, in line with the lower operative portion 87 and bent over forwardly at the top (FIG. 12). The portion 86 is curved outwardly away from the junction with the portion 87. The lower operative portion 87 of each tine 81 tapers towards its free end or tip and has a polygonal and preferably rectangular cross-section so that the distance between the opposite corners of the cross-section becomes different towards the free end or tip. A line of connection between the farthest spaced corners of the cross-section extends at least substantially tangentially to a circle centered on the axis a. From the free end or tip of the tine, the sides of the cross-section have grooves located between the corners, which grooves cover all, or substantially all, of the length of the operative portion 87, the corners farthest spaced apart being flattened so that ribs 88 are formed at the front and at the rear. The operative portions 87 of the tines 81 are in trailing positions with respect to the intended direction of operative rotation of the corresponding soil working member.

In the embodiment shown in FIG. 14, a fastening portion 89 between the tines 81 is not integral with the tines. The fastening portion 89 has at its ends cup-shaped recesses 90 having tapped holes 91 at their centers. The cup-shaped recesses 90 accommodate bulging parts 92 located at the level of the junctions between the portions 86 and 87. At the level of the bulging parts 92, the tines 81 have bores receiving bolts 93, which bolts are screwed into the tapped holes 91 of the parts 89.

In the embodiment shown in FIGS. 15 and 16, a fastening portion 94 is provided at each end with a recess 95 which at least half surrounds the junction between the upper and lower portions 86 and 87 of the corresponding tine 81. Near the center of each recess 95, the fastening portion 94 has a projecting screwthreaded stub 96 arranged inside a recess in the junction part of the tine and receiving a nut 97 located in a recess 98 of the tine (see FIG. 16).

In the embodiment shown in FIGS. 17 and 18, the elements corresponding with those of the preceding embodiments are designated by the same reference numerals. In this embodiment, each soil working member comprises two pairs of tines 99 and 100 made integrally from spring steel, the tines of the respective pairs, with their corresponding fastening portions 101 and 102, being shaped in the form of a U. The fastening portions 101 and 102 of the respective pairs of tines 99 and 100 are relatively arranged so that the tines of the two pairs extend in opposite directions, that is to say, upwards and downwards, respectively. Operative portions 103 and 104 of the tines 99 and 100 are at least substantially in line with one another (see FIG. 17) and extend at least substantially parallel to the axis a. The operative portions 103 of the tines 99 of the upper pair have a length which is approximately half that of the operative portions 104 of the tines 100 of the lower pair and, like the operative portions of the lower pair, they are torsioned in the manner described above in respect of earlier embodiments. The engaging, substantially horizontal fastening portions 101 and 102 of the pairs of tines 99 and 100 are provided at equal distances from their centers with bulging parts 105 and 106 respectively, which parts register to form spaces through which the lower pins 79 of the pivotal joint are passed. The fastening portions 101 and 102 are interconnected by three bolts 107 located on either side of each bulging part 105 and 106. The pins 79 are located in the spaces formed by the bulging parts 105 and 106 so that the pins are freely rotatable inside said spaces.

In the embodiment shown in FIGS. 19 and 20, the parts corresponding with those of the preceding embodiments are designated by the same reference numerals. In this embodiment, the arms 78 are arranged with respect to the axis a so that they are inclined away from the upper pins 77 in a downward and outward direction with the result that the pins 79 are further spaced apart than are the upper pins 77. The arms 78 are not provided with recesses that co-operate with cams or projections on the support 75 since, owing to the position of the arms, turning into the position shown is opposed to some extent. Each tine 108 has two operative portions 109 and 110 that extend in opposite directions (see FIG. 19) and that are in line, or substantially in line, with one another. The operative portions 109 and 110 are, during operation, substantially parallel to the axis a. In this embodiment, the tines 108 are made from spring steel rod of circular cross-section. The respective operating portions 109 and 110 of a tine 108 terminate through coils 111, which are arranged turnably around the pins 79, in a fastening portion 112 shaped in the form of an eye, a bolt 113 being passed through the eye so that the two tines 108 are rigidly secured to one another between the pins 79. FIG. 20 shows that, considered in the intended direction of rotation, the operative portions 109 and 110 of each tine are located one behind the other and are spaced from one another. Each portion 109 is located in front of the corresponding portion 110. The upper operative portion 109 of each tine 108 has a part extending rectilinearly away from the coils 111 and inclined upwardly and outwardly to terminate, through a curve of about 120°, in a part extending parallel or substantially parallel to the axis a and tapering towards its end. The lower operative portion 110 of each tine 108 has a straight part extending horizontally or substantially horizontally and terminating, through a curve of about 90°, in a part extending rectilinearly towards its free end, parallel or substantially parallel to the axis a, and in line with the corresponding part of the upper operative portion 109. Also, in this case, the operative portion 110 terminates in a sharp point or tip.

In the embodiment shown in FIGS. 21 and 22, again two tines 110A are provided one on each side of the axis a, each tine 110A having an upper and a lower operative portion 111A and 112A respectively. In this embodiment, the tine is made from leaf spring steel having a thickness of at least 5 mms, and a broad tangential side of at least 5 cms, in width. The operative portions 111A and 112A of each tine 110A are connected to the support 75 by a horizontal fastening portion 113A having two successive bulging parts 114, 115 and 114, 116 respectively, which parts are substantially cylindrically curved, the bulging parts 114 located alongside the operative portions 111A and 112A serving to accommodate the lower pins 79. Also in this embodiment, the pins 79 with the rings 85 and the spring pins 84 constitute a quick release fastening. At the neighbouring ends of the fastening portions 113A, the bulging parts 115 and 116 are constructed so that they fit one inside the other like the parts of a hinge (see FIG. 22). A pin or shaft 118 that is held in place by transverse spring pins 117 is passed through these co-operating loop-shaped bulging parts 115 and 116 so that, on the lower side of the arms 78 between the pins 79 forming part of the pivotable parallelogram linkage, a pivotal joint is obtained between the two tines 110A, which joint is also constructed as a quick release fastening. Pairs of clamping bolts 119 are arranged between the operative portions 111A and 112A of the tines and the bulging parts 114. The upper operative portion 111A of each tine 110A has a curved part extending upwardly and merging into a straight part that extends parallel or substantially parallel to the axis a and that terminates, through a curve of about 180°, in a downwardly extending, straight part which is parallel to the first-mentioned part. The lower operative portion 112A has a part that extends rectilinearly away from the fastening portion 113A and that terminates, through a curved part, in a part extending straight downwards and parallel to the axis a, the last mentioned part being in line with a downwardly extending part of the upper operative portion 111A.

In the embodiment shown in FIGS. 23 and 24, the hollow frame portion 1 is provided at the bottom with a plate forming a wall 120 of a chamber 121. The wall 120 has a horizontal central portion terminating at the front and rear in upwardly inclined, straight portions 122 which engage longitudinal front and rear sides of the frame portion 1. Each of the upwardly extending portions 122 terminates in a horizontal rim 124 which is secured to the hollow frame portion 1 by bolts 125. An internally splined support 126 is slipped onto the lower splined portion 15 of the shaft 2, said support 126 having at its bottom a flange 127 which is located just inside a hole in the substantially horizontal lower portion of the wall 120. The flange 127 is provided with upright stiffening ribs 128 which extend up to a hub 129 of the support 126. The support 126 is fixed to the shaft 2 by the locking washer 32 and the nut 33 like in the preceding embodiments. The locking washer 32 is located inside a recess 130 at the bottom of the support 126. The support 126 is provided with pairs of spaced tags 131, 132 and 133, 134 on either side of the recess 130. The pair of tags 131 and 132 (see FIG. 24) is offset with respect to the other pair of tags 133 and 134 relative to the axis a. Coils 137 of a fastening portion 138 of each of two tines 140 (FIGS. 24) are arranged between the tags 131, 132 and 133, 134 respectively by means of corresponding pins 135 which are similar to the pins 37 of the first embodiment and one end of each of which pins is held in place by a corresponding transverse spring pin 136. Each set of coils 137 terminates at one end in an operative portion 139 of the corresponding tine 140 and at the other end in a connecting part 141 having a curved portion which is at least partly concentric with the axis a (see FIG. 24). The connecting part 141 has the shape of an S, viewed in the direction of the axis a. The outermost coils 137 engage the slightly inclined inner sides of the tags 131, 132 and 133, 134 respectively. FIG. 23 shows that the coils 137 surround the pins 135 with some clearance that is located mainly beneath the pins. Each set of coils 137 terminates in a straight, downwardly and outwardly inclined part of the operative portion 139 of the corresponding tine 140, said part terminating, through a curve, in a part that extends rectilinearly downwards and that tapers towards its end. The tines 140 and the intermediate connecting part 141 are made from a single length of circular-section spring steel rod.

In the embodiment shown in FIGS. 25 and 26, the elements corresponding with those of the preceding embodiment are designated by the same reference numerals. A support 142 is slipped onto the splined portion 15 of the illustrated shaft 2, said support 142 being fastened in place by the locking washer 32 and the nut 33. The support 142 has a flange 143 which is located just inside the hole in the wall 120 of the hollow frame portion 1 like in the preceding embodiment. The flange 143 is provided on either side of the shaft 2 with a recess 144 housing pairs of tags 145 and 146, respectively. In this embodiment, the tags of the respective pairs are located diametrically opposite one another. Between the tags 145 and 146, by means of the pins 135, are arranged curved parts 148 forming elements of a fastening portion 149, which portion 149 extends between two tines 149A with which it is made from a single piece of leaf spring steel. The parts 148 partially surround the pins 135 with a predetermined clearance. Each pin 135 has at one end, a head and is fixed in place at the other end by a resilient transverse "safety" pin 136. The pins 135 and the "safety" pins 136 constitute a quick release fastening for securing the tines 149A in place. The curved parts 148 are interconnected by a downwardly bent-over part 151 which covers the nut 33 from beneath. Each tine 149A has an operative portion 147 having a straight part which extends away from the fastening portion 149 and that is inclined downwardly and outwardly to terminate, through a curve, in a straight, downwardly extending part orientated slightly outwardly towards its free end. In this embodiment, the straight, downwardly extending part is torsioned about its longitudinal axis in the manner described for some of the preceding embodiments so that, considered in the intended direction of operative rotation of the corresponding soil working member, the front edge is further spaced from the axis a than is the rear edge.

The implement described above operates as follows. In operation, the implement is attached by the coupling member or trestle 12 to the three-point lifting device or hitch of a tractor or other vehicle and, via the auxiliary shaft 7, the gear box 5, the change-speed gear 6 and the transmission formed by the gear wheels 4 in the hollow frame portion 1, each of the soil working members 3 can be driven by the power take-off shaft of the tractor or other vehicle. The soil working members 3 thus rotate in the directions indicated by arrows in FIG. 1, the tines of the members 3 working overlapping strips of soil. Owing to the particular design of the tines of the respective soil working members 3 shown in FIGS. 2 and 3, it is possible to work to a greater than usual depth, since the upper operative portion 40 of each tine 36 permits of moving the support itself into the ground. The upper operative portions 40 of the tines 36 treat the upper soil layer, any weeds, roots and the like thus being torn loose. Since the tines 36 are made from leaf spring steel, they are light-weight, flexible and yet resistive, while a smearing effect of the soil is avoided to a great extent owing to the trailing positions of the operative portions and their torsional shape, in which, considered in the directions of rotation, the front edges are further spaced from the rotary axes a than are the rear edges, the soil thus being satisfactorily crumbled up. In operation, the tines 36 of each member 3 are capable of deflecting about the axes b of the pins 37, which axes b are at an angle of about 90° to the axis a and extend parallel or substantially parallel to one another and substantially tangentially to the axis a so that the lower ends of the lower operative portions 41 can come into contact with one another. The deflection of the tines 36 about the respective axes b is limited by the walls of the recesses 34 in the support 31. The deflectability of the tines prevents damage thereto at an impact upon a stone or similar hard object in the ground, since the tines can readily deflect sideways, to which their properties of resilience contribute.

The tines 43 shown in FIG. 4 operate substantially in the same manner as the tines 36 shown in FIGS. 2 and 3. The ground can also be worked in two subjacent layers. A still more intensive working is obtained by the tines 47 and 48 located one above the other, as shown in FIGS. 5 and 6. The tines 61 shown in FIGS. 7 and 8, made from leaf spring steel, also have operative portions 64 and 65 located one above the other so that the support of the tines does not limit the depth of working. Also, in this case, the ground is worked at different depths, the upper operative portions tearing up weeds, roots and the like of the upper layer. The leaf spring steel tines otherwise have the same properties as do the tines of the preceding embodiments but, in this embodiment, the tines 61 cannot deflect with respect to the support 57 and the axis a.

In the further embodiment (FIGS. 9 and 10), the two tines 66 and 67 are arranged one above the other on one side of the soil working member. The lower tine 67 has an upper and a lower operative portion, whereas the upper tine 66 has only one operative portion. FIGS. 9 and 10 show that the respective operative portions of the tines also work adjoining layers of the ground, while the working depth is not limited by the tine support 68. Also in this embodiment, the tines 66 and 67 can deflect like those of some of the preceding embodiments. In this embodiment, the tines of adjacent soil working members are arranged so that a phase difference of 180° at the most around the corresponding axes a is obtained.

In the next embodiment, the tines 81 can deflect about further pivotal axes with respect to the support 75 during operation, the pins 77 and 79 being arranged so that they are at the corners of a parallelogram whereby, during operation, the tines 81 can effectively avoid most obstacles. The arms 78 have to move against the force of the cup springs 83 out of their illustrated position that is determined by the cams or projections 85A on the support 75. After the deflection, the cams or projections snap back into the recesses of the arms. In the embodiment shown, two tines 81 with their fastening portion 80 are integrally cast and the tines are also provided with upwardly extending operative portions so that the support again does not limit the working depth. The lower operative portions 87 of the tines 81 are particularly suitable for working heavy soils owing to their specific cross section which changes towards the free end or tip of each tine in the manner described above. In the construction shown in FIGS. 14 to 16, a worn-off or broken tine can be replaced, while the fastening portion is retained.

FIGS. 19 and 20 show that the tines 108 of circular-section spring steel each have the upper and lower operative portions 109 and 110 respectively. The arms 78 for the pivotable support of the tines diverge in a downward direction so that cams or projections can be dispensed with because, owing to their locations, the arms 78 tend to hold the tines 108 in the positions shown.

In the embodiment shown in FIGS. 21 and 22, the tines 110A are made from leaf spring steel and, by means of the parallelogram linkage, they are pivotable with respect to their support and also with respect to one another by means of the hinge between the lower axes of the parallelogram formed by the co-operating bulging parts 115, 116 and the pin or shaft 118. It will be obvious that, in this embodiment, the tines 110A have a still greater freedom of movement during operation.

In the embodiment shown in FIGS. 23 and 24, the tines 140 are capable of turning, during operation, about axes crossing the axis a at right angles and extending at least substantially in a tangential direction, by means of the coils 137 surrounding, with clearance, the pins 135 between the tags. By means of the resilient pins 136 and the pins 135, a quick release for fastening the tines 140 is obtained, said tines being made from a single length of circular-section spring steel rod. Since the support 126 is located inside the wall 120 of the hollow frame portion 1 in the chamber 121, damage and adhesion of soil are effectively avoided or greatly reduced.

In the last embodiment, the two tines 149A, one on each side of the axis a, and the fastening portion are made from a single piece of leaf spring steel. The fastening portion between the tines partially surrounds, with a given amount of clearance, the pins 135 arranged on either side of the axis a between the tags 145 and 146 so that, during operation, the tines are capable of deflecting about axes extending perpendicular or substantially perpendicular to the axis a. In this embodiment, the larger parts of the operative portions 147 of the tines are torsioned in the manner described above. After removal of the resilient pins 136, the pins 135 can be readily taken away and, with the resilient pins 136, they form a quick release fastening for the tines 149A. In this embodiment the support 142 is again located inside the lower chamber of the hollow frame portion so that it is protected and little, if any, material will stick to the support even at a great working depth.

Although various features of the soil cultivating implement or rotary harrow that have been described, and/or that are illustrated in the accompanying drawings, will be set forth in the following claims as inventive features, it is emphasised that the invention is not necessarily limited to those features and that it includes within its scope each of the parts of each of the embodiments that has been described and/or that is illustrated in the accompanying drawings both individually and in various combinations.

What we claim is:

1. A soil cultivating implement or rotary harrow comprising a plurality of tined soil working members arranged in a transverse row, said members being rotatable about upwardly extending axes defined by corresponding shafts journalled in a frame portion and driving means connected to said shafts, said soil working members each comprising a support and at least one tine on said support, said tine having two operative ends that extend downwardly and said ends being positioned to work the ground, said tine being pivotably connected to said support by a fastening portion and the latter being located between said ends, said tine being pivotable relative to said support about an axis that extends substantially perpendicularly to the axis of rotation of the corresponding soil working member, said pivotable axis being substantially tangential with respect to a circle centered upon the axis of rotation of said corresponding soil working member.

2. A soil cultivating implement or rotary harrow comprising a plurality of tined soil working members arranged in a transverse row, said members being rotatable about upwardly extending axes defined by corresponding shafts journalled in a frame portion and driving means connected to said shafts, said soil working members each comprising a support and at least one tine on said support, said tine having two operative ends that extend downwardly and said ends being positioned to work the ground, said tine being pivotably connected to said support by a fastening portion and the latter being located between said ends, said fastening portion being located at least partly within a recess of said support, said recess having a wall that comprises a stop that limits the pivotable movement of said tine.

3. A soil cultivating or rotary harrow comprising a plurality of tined soil working members arranged in a transverse row, said members being rotatable about upwardly extending axes defined by corresponding shafts journalled in a frame portion and driving means connected to said shafts, said soil working members each comprising a support and at least one tine on said support, said tine having at least one downwardly extending operative end and being pivotably connected to said support by a fastening portion, said fastening portion being freely pivotable relative to said support about a pivot axis that is substantially perpendicularly inclined to the axis of rotation of said corresponding soil working member, said pivot axis extending substantially tangential with respect to a circle centered upon the axis of rotation of said corresponding soil working member.

4. A soil cultivating or rotary harrow comprising a plurality of tined soil working members arranged in a transverse row, said members being rotatable about upwardly extending axes defined by corresponding shafts journalled in a frame portion and driving means connected to said shafts, said soil working members each comprising a support and at least one tine on said support, said tine having at least one downwardly extending operative end and being pivotably connected to said support by a fastening portion, said fastening portion being freely pivotable about pivot connection means that defines an axis inclined to the axis of rotation of the corresponding soil working member, said fastening portion being connected to said support with upper and lower pivots and said pivots being spaced apart from each other.

5. An implement as claimed in claim 4, wherein the support of each working member mounts two tines and each tine has a fastening portion connected to the support by respective upper and lower spaced apart pivots.

6. An implement as claimed in claim 5, wherein the fastening portions of the two tines are interconnected to one another.

7. An implement as claimed in claim 6, wherein the pivots for the fastening portion of each tine are located at opposite sides of the axis of rotation of the corresponding soil working member.

8. An implement as claimed in claim 6, wherein said fastening portions are interconnected via a pivot joint.

9. An implement as claimed in claim 8, wherein said pivot joint is positioned between the lowermost pivots of said two fastening portions.

10. An implement as claimed in claim 9, wherein said pivot joint extends substantially parallel to said pivots.

11. An implement as claimed in claim 5, wherein said spaced apart pivots are interconnected by arm means.

12. An implement as claimed in claim 5, wherein said pivots extend substantially parallel to each other.

* * * * *